US008437576B2

(12) United States Patent
Efimov

(10) Patent No.: US 8,437,576 B2
(45) Date of Patent: May 7, 2013

(54) METHOD OF CORRECTING ORIENTATION OF AN IMAGE IN AUTOMATIC PRINTING, AND AN IMAGE FORMING METHOD AND IMAGE FORMING APPARATUS THEREOF

(75) Inventor: Sergei V. Efimov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 913 days.

(21) Appl. No.: 12/489,673

(22) Filed: Jun. 23, 2009

(65) Prior Publication Data

US 2009/0317000 A1 Dec. 24, 2009

(30) Foreign Application Priority Data

Jun. 23, 2008 (RU) ................................ 2008125031

(51) Int. Cl.
*G06K 9/36* (2006.01)
(52) U.S. Cl.
USPC ..................................... 382/289; 235/462.02

(58) Field of Classification Search .................. 382/112, 382/176, 276, 289–292, 296, 297, 309, 321; 235/462.01, 462.02
See application file for complete search history.

(56) References Cited

U.S. PATENT DOCUMENTS

| 5,060,276 | A * | 10/1991 | Morris et al. ................. 382/151 |
| 5,313,311 | A * | 5/1994 | Brandkamp ................. 358/474 |
| 5,506,918 | A * | 4/1996 | Ishitani ........................ 382/289 |
| 5,767,978 | A | 6/1998 | Revankar et al. |
| 5,889,884 | A | 3/1999 | Hashimoto et al. |
| 7,333,676 | B2 * | 2/2008 | Myers et al. .................. 382/289 |
| 8,144,989 | B2 * | 3/2012 | Speigle et al. ................ 382/177 |
| 2005/0163399 | A1 * | 7/2005 | Aradhye ........................ 382/290 |
| 2006/0120629 | A1 * | 6/2006 | Myers et al. .................. 382/321 |

* cited by examiner

*Primary Examiner* — Anand Bhatnagar
(74) *Attorney, Agent, or Firm* — Stanzione & Kim, LLP

(57) ABSTRACT

An image forming method includes receiving an image, detecting a text area from the image, transforming the detected text area into a binary image and calculating an asymmetry parameter of the binary image, and detecting orientation of the image based on the calculated asymmetry parameter.

18 Claims, 10 Drawing Sheets

FIG. 1

The general pipeli
, process these im
ifferent kinds of c
graphics, and natu
of various levels
ues such as halfton
t ways with vario
mut, moire, etc. F
ction quality, dep
d reproductions, d

METHOD OF CORRECTING ORIENTATION OF AN IMAGE IN AUTOMATIC PRINTING, AND AN IMAGE FORMING METHOD AND IMAGE FORMING APPARATUS THEREOF

CROSS-REFERENCE TO RELATED APPLICATIONS

This application claims priority under 35 U.S.C. §119(a) from Russian Patent Application No. 2008125031, filed on Jun. 23, 2008, in the Russian Patent Office, and Korean Patent Application No. 10-2009-0041285, filed on May 12, 2009, in the Korean Intellectual Property Office, the disclosures of which are incorporated herein by reference in their entirety.

BACKGROUND

1. Field of the Invention

The present general inventive concept relates to processing images in the field of scanning and copying and detecting correct orientation of the processed images, and more particularly, to text recognition.

2. Description of the Related Art

Efforts to improve quality assurances and to process recognition of text include a necessity to automatically detect orientation of individual pages. Inverted pages (the top side is down) are found during scanning of paper documents. Orientation of page of the document is determined by a direction in which lines of the text are printed. During a printing operation, the text is usually typed in a portrait or landscape mode. Hence, the page can be printed in a horizontal mode of print (portrait mode) or in a vertical mode of print (landscape mode). In processing recognition of text, it is important to know orientation of the text in the image of the document prior to beginning operation of recognition. For automation of process of recognition of the text, automatic detection of orientation of pages improves general productivity.

It is also important to copy the pages fed from an automatic feeder with a correct orientation for the further processing, for example, by a stapler, a puncher or a machine for binding printed blocks. The present general inventive concept provides a new algorithm which can be used in Multipurpose Digital Devices (MFP) and can automatically detect orientation of a document.

Previous methods for detecting orientation of a document use a technique to detect orientation of a document based on vertical and horizontal variations of profiles of projections in a binary image. The main reason for errors in these methods is presence of non-text data. Algorithms of such methods work only for documents with prevalence of the text. Thus, a first operation of detecting orientation of the document is finding the text.

U.S. Pat. No. 5,767,978 [1] describes a method of classifying areas of an image into 3 classes, such as traditional text, line-art image and photo. Classification is carried out using the collected statistics of the image on variation values of brightness and absolute brightness value of each pixel. Obviously, the result of classification depends on the accuracy of the algorithm used to segment an area of the image. Classification can be erroneous if the area of the image contains data which belongs to one or more class. For example, if the area of the image contains text and photo, it can be classified into any one of three classes. Reliability of classification can be improved, using a divider of areas instead of a divider of lines and using more complex methods of classification of areas. Areas of line-art images that have intermediate attributes and areas which do not satisfy criteria of text or photo are classified into line-art image.

U.S. Pat. No. 5,889,884 [2] describes a method of automatically defining orientation of an image (normal, inverted) of a document. The algorithm operates for texts in Romance languages. Thus, distribution of cumulative values of pixels in profiles of projections in vertical and horizontal directions is analyzed. However, the algorithm works only for binary images of documents with prevalence of the text and is not capable of detecting portrait/landscape orientation. The algorithm does not operate for color images and a document containing photos.

SUMMARY

Example embodiments of the present general inventive concept provide a method of detecting correct orientation of a page and correcting a possible error of orientation.

Additional embodiments of the present general inventive concept will be set forth in part in the description which follows and, in part, will be obvious from the description, or may be learned by practice of the general inventive concept.

Example embodiments of the present general inventive concept may be achieved by providing a method of detecting orientation of an image including selecting text blocks, testing whether the number of text blocks N is less than a pre-set threshold T, if the number of text blocks N is less than the pre-set threshold T, not detecting the orientation of the document, if the number of text blocks N is greater than the pre-set threshold T, filling non-text areas with white color, transforming the image into a binary image, calculating asymmetry parameters of text (asym0, asym90), calculating a horizontal coefficient (ah) and a vertical coefficient (av), testing whether the parameter (asym0) is greater than zero and whether the horizontal coefficient (ah) is greater than the vertical coefficient (av), if a result of testing whether the parameter (asym0) is greater than zero and the horizontal coefficient (ah) is greater than the vertical coefficient (av) is positive, determining that the image has correct orientation, if a result of testing whether the parameter (asym0) is greater than zero and the horizontal coefficient (ah) is greater than the vertical coefficient (av) is negative, testing whether the parameter (asym0) is less than zero and the horizontal coefficient (ah) is greater than the vertical coefficient (av), if a result of testing whether the parameter (asym0) is less than zero and the horizontal coefficient (ah) is greater than the vertical coefficient (av) is positive, turning the image by 180 degrees, if a result of testing whether the parameter (asym0) is less than zero and the horizontal coefficient (ah) is greater than the vertical coefficient (av) is negative, testing whether the parameter (asym90) is greater than zero and whether the horizontal coefficient (ah) is less than the vertical coefficient (av), if a result of testing whether the parameter (asym90) is greater than zero and the horizontal coefficient (ah) is less than the vertical coefficient (av) is positive, turning the image by 90 degrees, and if a result of testing whether the parameter (asym90) is greater than zero and the horizontal coefficient (ah) is less than the vertical coefficient (av) is negative, turning the image by 270 degrees.

In accordance with other example embodiments of the present general inventive concept, an operation of checking correctness of the orientation of an electronic representation of a page may be performed prior to distributing pixels of the image in a scanning direction and a perpendicular direction.

Example embodiments of the present general inventive concept may also be achieved by providing an image forming apparatus and a method thereof which can be executed with the capability of generating copies from an electronic representation of a page of a document, the image forming apparatus including a block to form an image to generate copies for electronic representation of page of document, a processor, and a memory block which can include an algorithm to process the page and is executed by the processor when testing correctness of orientation of electronic representation of page and rotating the electronic representation of page before correct orientation.

Also, the image forming apparatus may further include an optical scanner. In general, MFP may be used as such an image forming apparatus.

The example methods can further include an operation to detect whether a page has portrait or landscape orientation, normal orientation, or orientation in which page is turned upside down.

The orientation of a page can be detected to calculate asymmetry of text consisting of letters of Romance alphabet. Existing algorithms can use asymmetry of text only for definition of normal/inverted orientation. It makes it impossible to apply the existing approaches for correct orientation of pages of a format portrait/landscape. The offered algorithm can detect both the normal/inverted orientation and the portrait/landscape orientation. This advantages makes the offered algorithm more effective when realizing it in the MFP.

The present general inventive concept can also provide a method of detecting orientation of text in black-white or color image of document incorporating non-text components (photo, figures, etc) simply, effectively, and economically.

The first operation to detect orientation of page is finding an area of text. Then, the area of text can be processed to detect orientation. Another operation can transform an RGB image into a binary image. Then, asymmetry of vertical and horizontal profiles of projections can be calculated and it can be determined whether the page is correctly oriented is detected. If not, its reorientation is made.

Example embodiments of the present general inventive concept may be also achieved by providing an image forming method including receiving an image, detecting a text area of the image, transforming the detected text area into a binary image and calculating an asymmetry parameter of the binary image, and detecting orientation of the image based on the calculated asymmetry parameter.

The image forming method may further include, adjusting the orientation of the image if the detected orientation of the image differs from a default direction.

The image forming method may further include printing the image the orientation of which is adjusted.

The image forming method may further include storing the image the orientation of which is adjusted.

The receiving the image may include scanning an image through a scanning unit of the image forming apparatus.

The calculating the asymmetry parameter may include calculating an asymmetry coefficient, a horizontal coefficient, and a vertical coefficient of the text.

The detecting the orientation may include detecting whether the image is in a horizontal mode (portrait) or a vertical mode (landscape) and whether the image is oriented up or down in each mode.

Example embodiments of the present general inventive concept may be also achieved by providing an image forming apparatus including a text detection unit to detect a text area of an input image, a coefficient calculation unit to transform the detected text area into a binary image and to calculate an asymmetry parameter of the binary image, and an orientation detection unit to detect an orientation of the image based on the calculated asymmetry parameter.

The image forming apparatus may further include an orientation adjustment unit to adjust the orientation of the input image if the detected orientation of the image differs from a default direction.

The image forming apparatus may further include a print engine unit to print the image the orientation of which is adjusted.

The image forming apparatus may further include a storage unit to store the image the orientation of which is adjusted.

The image forming apparatus may further include a scanning unit to scan an image, and the text detection unit may receive the image scanned by the scanning unit.

The coefficient calculation unit may calculate an asymmetry coefficient, a horizontal coefficient and a vertical coefficient of the text.

The orientation detection unit may detect whether the image is in a horizontal mode (portrait) or a vertical mode (landscape) and whether the image is oriented up or down in each mode.

Example embodiments of the present general inventive concept may be also achieved by providing an apparatus to detect orientation of an image, including a text detection unit to detect a text area of the image, a calculation unit to calculate a projection profile of the detected text, and an orientation detection unit to determine the orientation of the image based on the projection profile.

The projection profile can include a vertical projection profile and a horizontal projection profile.

The calculation unit can calculate the projection profile based on a frequency of occurrence of predetermined letters of text.

The apparatus can further include an orientation adjustment unit to rotate the image based on the determined orientation.

Example embodiments of the present general inventive concept may be also achieved by providing a method of detecting orientation of an image, including detecting a text area of the image, calculating a projection profile of the detected text, and determining the orientation of the image based on the projection profile.

The method may further include detecting a difference between heights of peaks of the detected text.

The calculating of the projection profile can be based on a frequency of occurrence of predetermined letters of text.

The method may further include rotating the image based on the determined orientation.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIG. 1 is a view illustrating a fragment of a page vertically leveled;

DETAILED DESCRIPTION OF THE EMBODIMENTS

Figure 2:
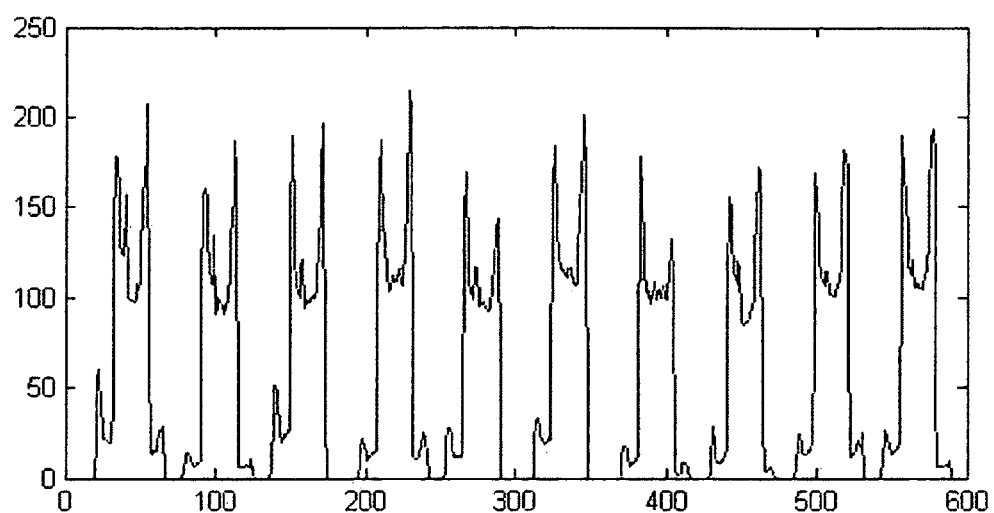
FIG. 2 is a view illustrating a horizontal projection of a page.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

A method of automatically detecting the orientation of a document can be based on asymmetry of text consisting of the Romance alphabets and digits. For example, in the English language, capital letters are typically extended upwards in comparison with small letters. In addition, small letters such as "b, d, f, h, i, j, k, l, t" have parts extended upwards in comparison with other small letters, and letters such as "g, j, p, q, y" have parts extended downwards in comparison with other small letters. Also, it is known that letters having parts extended upwards, (for example b) usually appear more frequently than letters having parts extended downwards (for example p) even if frequency of occurrence of corresponding letters is considered. In the present general inventive concept, the top and bottom portions of a series of letters can be detected based on the above-mentioned characteristics of the Romance alphabet. In particular, for small letters of English language, it has been determined that the frequency of occurrence of letters "b, d, f, h, i, j, k, l, t" is about 26.5%, while the frequency of letters "g, j, p, q, y" is about 6.25% and other letters is about 67.25% accordingly (see Kahn D., 1967. The Code breakers—the Story of Secret Writing. Macmillan, N.Y. [3]). Such a given ratio of occurrence of letters can also be applied to other Romance languages (German, French, etc.). Thus, for a document containing a large number of letters, it can be determined that the top orientation of the document will be in a direction in which the main part of the lines of the text extend beyond a predetermined range.

Accordingly, attributes can be extracted from profiles of the projections of lines extending from the text. For purposes of describing example embodiments of the present general inventive concept, a page (N, M) can be designated in a binary image of a document having N lines and M columns. Here, a vertical profile of a projection can be defined as the sum of black pixels which is perpendicular to axis y. That is, the vertical profile can be represented by a vector Pv of length N as follows:

$$Pv[i] = \sum_{j=1}^{M} \text{page}(i, j)$$ [Equation 1]

The horizontal profile of the projection can be defined as the sum of black pixels perpendicular to axis x, i.e., the horizontal profile can be represented by a vector Ph of length M as follows:

$$Ph[j] = \sum_{i=1}^{N} \text{page}(i, j)$$ [Equation 2]

FIG. 1 illustrates a fragment of a text page developed downwards along a horizontal direction. Here, the text is considered as being turned (or rotated) in the manner illustrated in FIG. 1. The algorithm of the present general inventive concept can be based on a calculation of a profile of a horizontal projection along a narrow vertical strip of page of the text. Results from a concrete vertical strip of page of the text are usually united with corresponding results for other such strips.

Figure 3:
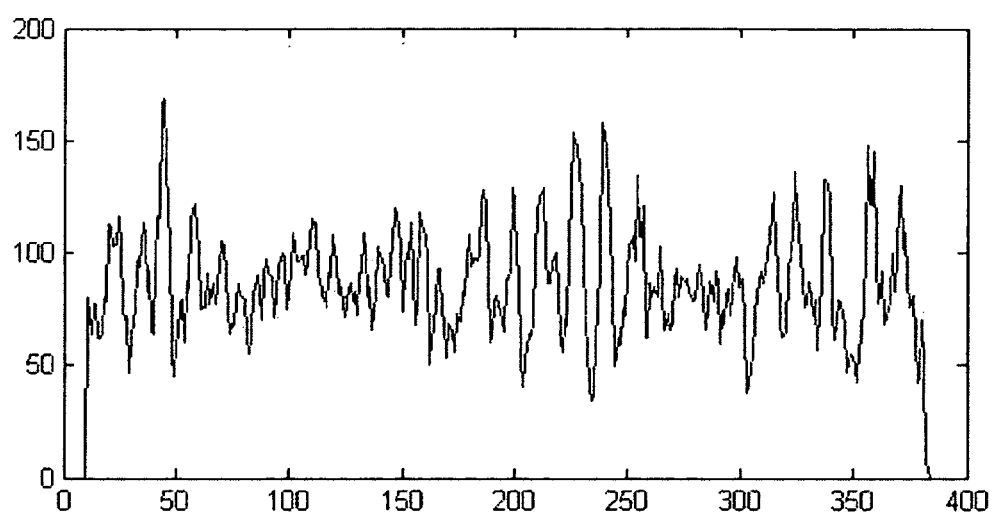
FIG. 3 is a view illustrating a vertical projection of a page.

FIG. 2 illustrates a horizontal profile of the projection of FIG. 1. FIG. 3 illustrates a vertical profile of the projection of FIG. 1.

Referring to FIG. 2, it is possible to see that the schedule of a horizontal structure of a projection can detect two indications of asymmetry of the normal and inverted text. Here, the first indication is a structure of peaks and the second indication is a plateau structure of peaks. Basically, the bottom peak is much smaller than the top peak. On the plateau, the bottom peak is typically much greater than the top peak.

Figure 4:
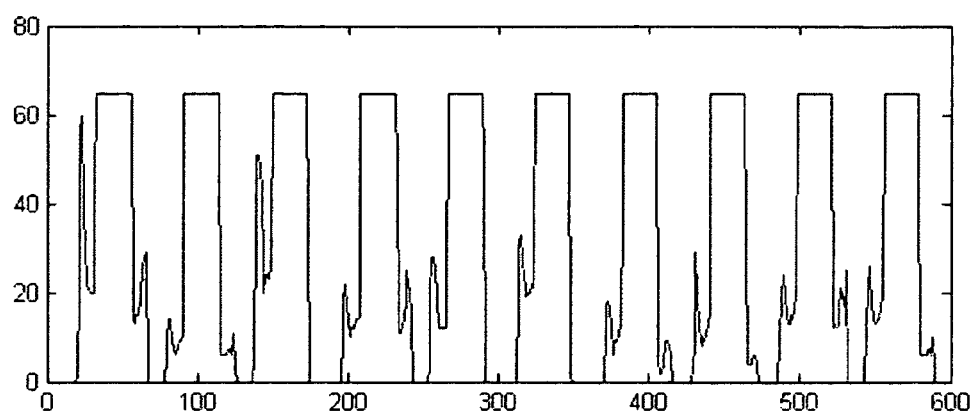
FIG. 4 is a view illustrating a horizontal profile of projection after a threshold is processed.

Asymmetry (asym) of the text will be defined below. If threshold processing is applied to horizontal peaks of the projection at a level of plateau, a threshold projection (tp) can be obtained as follows:

$$tp(j) = \min(Ph(j), \text{thresh}*\max(Ph))$$ [Equation 3]

wherein a corresponding value (thresh) of a threshold concerning a global maximum value of a function of a projection in this example embodiment is equal to about 0.4. The graphic to which tp is applied is illustrated in FIG. 4.

The following operation is differentiating the result of threshold processing of the projection. We shall determine a differentiated threshold projection (dtp) as follows:

$$dtp(j) = tp(j+1) - tp(j)$$ [Equation 4]

Figure 5:
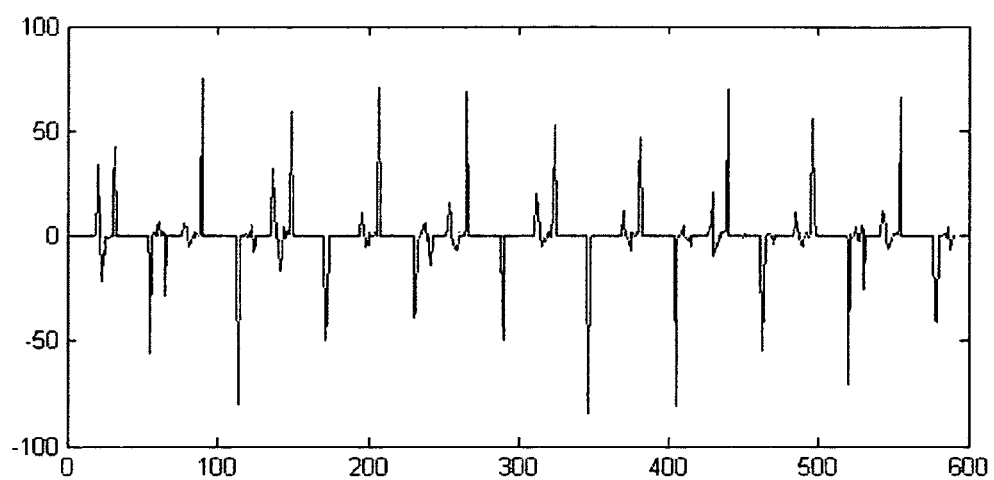
FIG. 5 is a view illustrating a differentiated horizontal profile of projection after a threshold is processed.

In FIG. 5, the graphic to which dtp is applied is illustrated. Referring to FIG. 5, it can be seen that each line of the text has one or two large positive peaks in an upward direction and usually one even larger negative peak in a downward direction, and also has several smaller peaks. This confirms that asymmetry of the text remains at this operation of the algorithm.

The integral of dtp by all lines can be defined as a difference between values for tp for the bottom and the top of lines of the text and does not necessarily serve as an indicator of orientation. For effective definition of orientation, it can be advantageous to transform the non-linear dtp to detect a difference between heights of peaks. A squaring operation can be applied to the dtp to transform the dtp. For example, it is possible to calculate a squared differentiated threshold projection (sdtp) as follows:

$$sdtp(j) = dtp^2(j)$$ [Equation 5]

Figure 6:
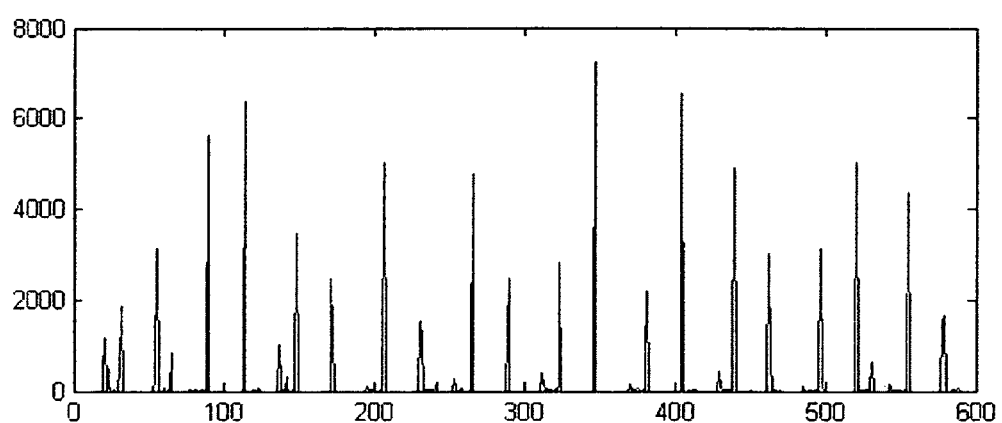
FIG. 6 is a view illustrating a square of differentiated profile of projection after a threshold is processed.

The graphic to which squaring dtp is applied is illustrated in FIG. 6.

When squaring the dtp, sign information which is present in the dtp is lost and thus the sign of dtp is imposed on sdtp, i.e., a signed squared differentiated threshold projection can be generated as follows:

$$ssdtp(j) = \text{sign}(dtp(j))*sdtp(j)$$ [Equation 5]

Figure 7:
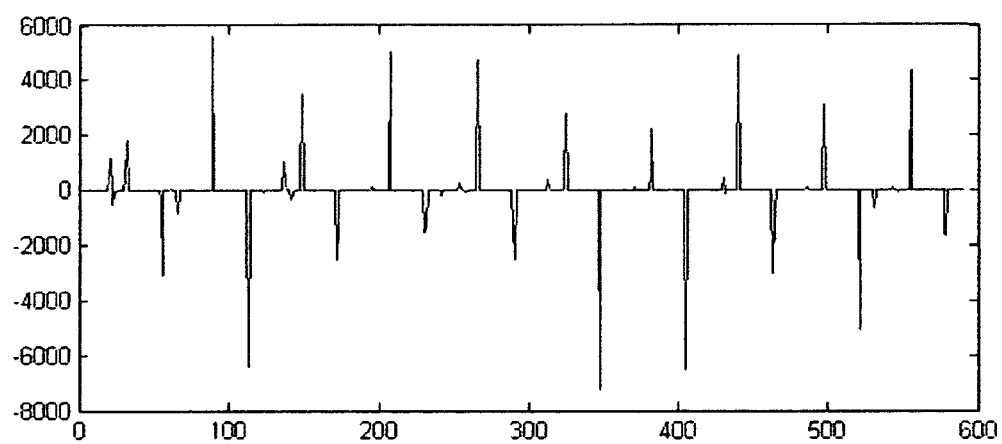
FIG. 7 is a view illustrating a square of differentiated profile of projection after a threshold is processed with a sign.

The graphic to which the sign after squaring dtp is applied is illustrated in FIG. 7.

The orientation of a page can be defined from functions (sdtp and ssdtp) based on that a correctly oriented page will have negative peaks (ssdtp) prevailing above positive peaks on the average for all lines. The normalized measure of this asymmetry (asym') can be calculated as follows:

$$asym' = -\frac{\sum_j ssdtp(j)}{\sum_j sdtp(j)} \quad \text{[Equation 7]}$$

wherein the text is correctly oriented if asym' is positive and the text is inverted if asym' is negative. This can be reflected on a discrete variable (up') as follows:

$$up' = asym' > 0 \quad \text{[Equation 8]}$$

The level of reliability of a variable (up') can increase with an increase of the absolute value asym'.

The algorithm can calculate a horizontal projection by a narrow vertical strip of page of the text (FIG. 1). Results for the given strip of the text can be united with corresponding results for other such strips. The previous operations can be repeated for each vertical strip and functions (sdtp and ssdtp) can be collected for all strips forming a cumulative squared differentiated threshold projection (csdtp) and a cumulative signed squared differentiated threshold projection (cssdtp) as follows:

$$csdtp(j) = \sum_{n_{strip}} sdtp(n_{strip}; j) \quad \text{[Equation 9]}$$

$$cssdtp(j) = \sum_{n_{strip}} sdtp(n_{strip}; j) \quad \text{[Equation 10]}$$

The normalized measure of asymmetry of the text (asym) can be calculated as follows:

$$asym = -\frac{\sum_j cssdtp(j)}{\sum_j csdtp(j)} \quad \text{[Equation 10]}$$

wherein a text is correctly oriented if asym is positive and a text is inverted when asym is negative. This can be reflected on a discrete variable (up):

$$up = asym > 0$$

As the denominator asym is positive, the result of detection of orientation depends on the numerator asym. The denominator asym has an important property of normalization of statistics, so the value of asym is connected with the same level of confidence in decision-making on orientation irrespective of the quantity of the asym. It can be noticed that the total results on vertical strips can be expanded on some pages with a corresponding increase of a level of confidence on decision-making on the orientation of the document if it is known that pages have identical orientation.

For an area of text, an error in calculation of asym is inversely proportional to a square root from the area of text. That is, the more area of text, the more precise result.

An algorithm to calculate asymmetry of the text can be defined as follows:

1. A profile of a projection is calculated;
2. Threshold processing is applied to the projection;
3. The profile of the projection after the threshold processing is differentiated;
4. A square of the differentiated threshold projection after the threshold processing is calculated;
5. The square of the differentiated threshold projection after the threshold processing is calculated with a sign;
6. A cumulative value of the square of the differentiated threshold projection after the threshold processing is calculated;
7. The cumulative value of the square of the differentiated threshold projection after the threshold processing is calculated with a sign;
8. Asymmetry of the text (asym) is calculated;
9. If asym>0, text is oriented correctly, and otherwise, the text is inverted.

Figure 8:
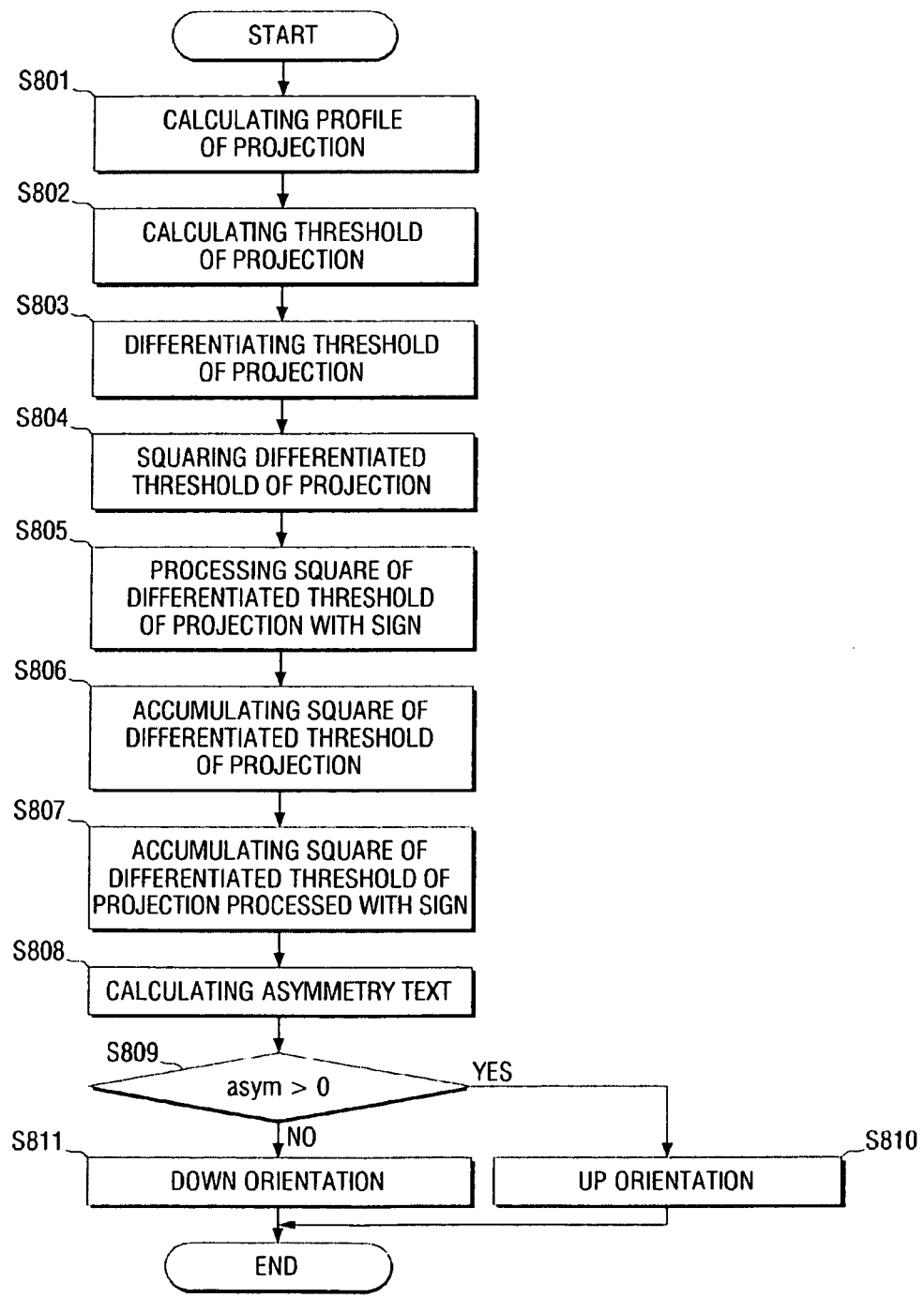
FIG. 8 is a flowchart illustrating an algorithm to calculate asymmetry.

FIG. 8 is a flowchart illustrating an algorithm to calculate asymmetry of the text. Calculation of a profile of a projection can be carried out in operation S801. Calculation of result of threshold processing for the projection can be carried out in operation S802. Calculation of a differentiated profile of the projection after threshold processing can be carried out in operation S803. Calculation of a square of the differentiated threshold projection after threshold processing can be carried out in operation S804. Calculation of the square of the differentiated threshold projection after threshold processing with a sign can be carried out in operation S805. Calculation of a cumulative value of the square of the differentiated threshold projection after threshold processing can be carried out in operation S806. Calculation of the cumulative value of the square of the differentiated threshold projection after threshold processing with a sign can be carried out in operation S807. Calculation of asymmetry of the text (asym) can be carried out in operation S808. The algorithm can check whether asym is more zero or not in operation S809. If yes, it can be determined that the orientation is correct in operation S810. If no, it can be determined that the page is inverted in operation S811.

If it is assumed that asym0 is the orientation of the initial document of the image, asym90 represents asymmetry of the initial image turned on 90 degrees; asym180 represents asymmetry of the initial image turned on 180 degrees, and asym270 represents asymmetry of the initial image turned on 270 degrees. For convenience of description, a rotation angle of the image will be defined herein as a counter-clockwise direction. Here, Asym0 and asym180, asym90 and asym270 have approximately identical values, but have opposite signs. Thus, if it is assumed that factors ah0 and av0 are average absolute values for asym0 and asym180, asym90 and asym270 (wherein h means a horizontal direction, and av means a vertical direction), the following equations can be established:

$$ah0 = 0.5 * (|asym0| + |asym180|) \quad \text{[Equation 12]}$$

$$av0 = 0.5 * (|asym90| + |asym270|) \quad \text{[Equation 13]}$$

An experiment was conducted to calculate coefficients ah0 and av0 using a database of images of 500 or more colors and black-and-white documents scanned with a resolution of 300 points per inch.

It was found that |asym0| is approximately equal to |asym180| and |asym90| is approximately equal to |asym270|. To accelerate the calculations, it is possible to use following equations:

$$ah = |asym0| \quad \text{[Equation 14]}$$

$$av = |asym90| \quad \text{[Equation 15]}$$

For images of documents in Romance languages with horizontal lines, the horizontal coefficient (ah) is greater than the vertical coefficient (av) for about 98% of the images. Hence, it is possible to detect orientation of the image of the document using the horizontal coefficient (ah) and the vertical coefficient (av).

The first operation in detecting the orientation of a document in accordance with the present general inventive concept it to select areas of text. In the example embodiments of the present general inventive concept, it is expedient to use a method of selecting areas of text such as the one offered in U.S. Pat. No. 5,767,978 [4]. If the number of text blocks N is less than a set threshold T, it can be determined that the image does not contain text and detection of the orientation of the document is not carried out. Otherwise, it can be determined that the image is a text document and the next operation of filling non-text areas with white color and transforming a RGB image into a binary image can be carried out. Here, transforming the RGB image into the binary image can be carried out in two operations: The first operation can be transforming a RGB image into a black-and-white image; and the second operation can be transforming the black-and-white image to a binary image. In accordance with the example embodiments of the present general inventive concept, the operation of transforming the RGB image into the black-and-white image can be carried out by averaging the sum of R, G and B components. For example, transforming the black-and-white image into the binary image may use an algorithm of an adaptive threshold of a sliding average as described in J. R. Parker Algorithms for image processing and computer vision. (Wiley Computer Publishers, New York, 1997 p. 145-149 [5]). Parker's algorithm has been developed for the images containing the text and generally gives good results of segmentation. Then, the algorithm based on ratio (ah and av) can be applied to the binary image for detection of orientation portrait/landscape. A final operation can be to detect correct orientation using a positive value (asym).

An algorithm to calculate asymmetry of the text can be defined as follows:

1. Text blocks are selected;
2. If the number of text blocks N is less than a set threshold T, orientation of the document is not conducted, otherwise,
3. Non-text areas are filled with a white color;
4. A RGB image is transformed into a binary image
5. asym0 and asym90 are calculated;
6. ah and av are calculated;
7. If ah>av and asym0>0, the image has correct orientation;
8. If ah>av and asym0<0, it is necessary to turn the image by angle of 180 degrees for correct orientation;
9. If ah<av and asym90>0 it is necessary to turn the image by angle of 90 degrees for correct orientation; and
10. Otherwise, the image is turned by angle of 270 degrees for correct orientation.

Figure 9:
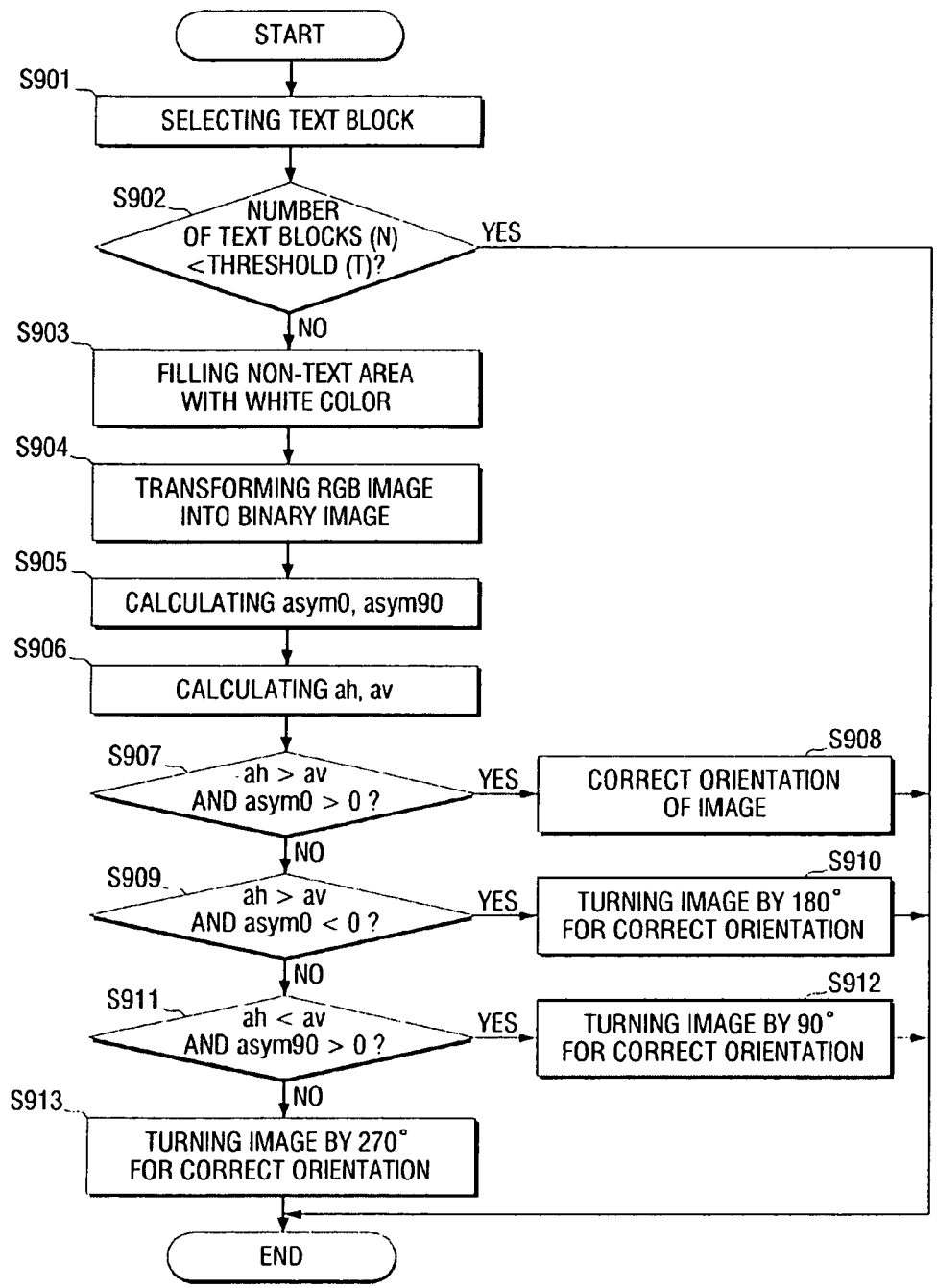
FIG. 9 is a flowchart illustrating an algorithm to detect orientation of a document.

FIG. 9 is a flowchart illustrating an algorithm to detect orientation of the document. Here, text blocks can be selected in operation S901. Testing whether the number of text blocks N is less than a set threshold T can be performed in operation S902. If yes, it can be determined that the image does not contain the text and detection of orientation of the document is not carried out. If no, filling non-text areas with white color can be carried out in operation S903. Transformation of a RGB image into a binary image can be carried out in operation S904. Calculation of parameters asym0 and asym90 can be carried out in operation S905. Calculation of parameters ah and av can be carried out in operation S906. Testing whether asym is greater than zero and ah is greater than av can be carried out in operation S907. If asym is greater than zero and ah is greater than av, it can be determined that a document has correct orientation in operation S908. If not, testing whether asym is less than zero and ah is greater than av can be carried out in operation S909. If asym is less than zero and ah is greater than av, it can be determined that the image is turned by angle of 180 degrees for correct orientation in operation S911. If not, testing whether asym90 is greater than zero and ah is less than av can be carried out in operation S911. If asym90 is greater than zero and ah is less than av, it can be determined that the image is turned by angle of 90 degrees for correct orientation in operation S912. If not, it can be determined that the image is turned by angle of 270 degrees for correct orientation in operation S913.

As described herein, an example algorithm of the present general inventive concept can be used to detect and correct the orientation of an entering document, and can be applied to such devices as MFP. This algorithm is also capable to correct copying of inverted pages fed from an automatic feeder for further processing, for example, by a stapler, a puncher or a machine to bind printed blocks. This algorithm may also be performed prior to beginning a process of recognition, to improve a process of recognition of text. The automatic definition of the orientation thus increases total productivity.

Figure 10:
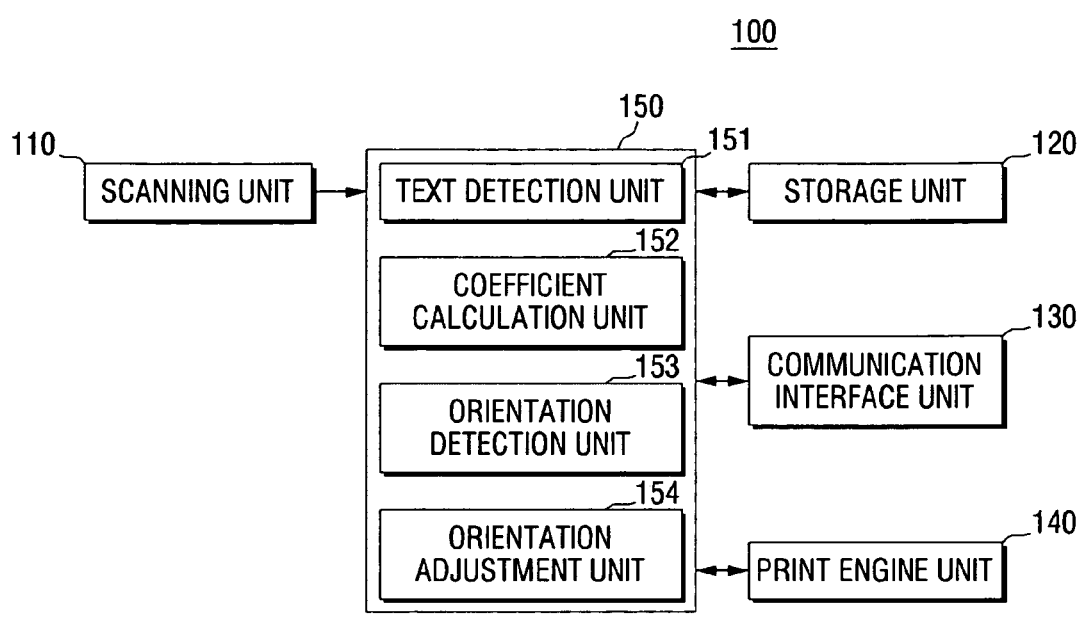
FIG. 10 is a block diagram illustrating an image forming apparatus according to an exemplary embodiment of the present general inventive concept.

FIG. 10 is a block diagram illustrating an image forming apparatus 100 according to an exemplary embodiment of the present general inventive concept. Referring to FIG. 10, the image forming apparatus 100 can include a scanning unit 110, a storage unit 120, a communication interface unit 130, a print engine unit 140, and a control unit (processor) 150. The image forming apparatus 100 may be a copier, a printer, a facsimile machine, a scanner or a multifunction peripheral (MFP) to carry out the functions of the aforementioned devices through a single device.

The scanning unit 110 can include a scan module and an image processing processor to scan a document. The scanning unit 110 may be of a flatbed type or a duplex auto document feeder (DADF) type, or other known or later developed scanning units.

The storage unit 120 may store data scanned by the scanning unit 110. Also, the storage unit 120 may store an image the orientation of which has been adjusted. The storage unit 130 may be comprised as an internal storage medium or an external storage medium, for example, a removable disk including a USB memory, a storage medium connected to the host, or a web server over a network, although the present general inventive concept is not limited thereto.

The communication interface unit 130 can be connected to a terminal device such as a PC, a laptop computer, a personal digital assistant (PDA), and a digital camera. More specifically, the communication interface unit 130 can be designed to connect the image forming apparatus 100 to an external device, and may be connected to the terminal device through a local area network (LAN) and the internet or through a universal serial bus (USB) port. Also, the communication interface unit 130 may receive a command regarding a printing job through the terminal device (not illustrated), and may transmit data scanned by the scanning unit 110 and an image the orientation of which has been adjusted with respect to the scanned data to the terminal device (not illustrated).

The print engine unit 140 can perform a printing job input from the communication interface unit 130 or can print the image scanned by the scanning unit 110. The print engine unit 140 may print the image the orientation of which has been adjusted.

The control unit 150 can detect orientation of an image input through the communication interface unit 130, an image pre-stored in the storage unit 120, or an image scanned by the scanning unit 110, and can adjust the orientation of the image. More specifically, the control unit 150 may include a text detection unit 151, a coefficient calculation unit 152, an orientation detection unit 153, and an orientation adjustment unit 154.

The text detection unit 151 can detect a text area from an input image. More specifically, the text detection unit 151 can detect a text area from the image input through the communication interface unit 130, the image pre-stored in the storage unit 120, or the image scanned by the scanning unit 110, and can fill a non-text area with white color.

The coefficient calculation unit 152 can transform the detected text area into a binary image, and can calculate an asymmetry parameter of the binary image. More specifically, the coefficient calculation unit 152 can transform the text area detected by the text detection unit 151 into a binary image to calculate asymmetry parameters of the text area, that is, asymmetry coefficients (aysm0, asym90) and a horizontal coefficient (ah) and a vertical coefficient (av). An exemplary method of calculating the asymmetry parameter coefficients was described above and thus a detailed description thereof will be omitted here.

The orientation detection unit 153 may detect the orientation of the image based on the asymmetry parameters calculated by the coefficient calculation unit 152. More specifically, the orientation detection unit 153 can detect whether the image is in a horizontal mode (portrait) or a vertical mode (landscape) and whether the image is oriented up or down in each mode using the asymmetry coefficients (asym0, asym90) and the horizontal and the vertical coefficients (ah and av) calculated by the coefficient calculation unit 152.

The orientation adjustment unit 154 can adjust the orientation if the orientation of a current image differs from a default direction based on the orientation of the image detected by the orientation detection unit 153. More specifically, if the parameter asym0 is greater than zero and the horizontal coefficient (ah) is greater than the vertical coefficient (av), the orientation adjust unit 154 can determine that the image has correct orientation and does not perform extra adjustment, and if the parameter asym0 is less than zero and the vertical coefficient (ah) is greater than the vertical coefficient (av), it can be determined that the image is turned by 180 degrees, and if the parameter asym90 is greater than zero and the horizontal coefficient (ah) is less than the vertical coefficient (av), it can be determined that the image is turned by 90 degrees. If an image does not satisfy the above-described condition, it can be determined that the image is turned by 270 degrees.

The control unit 150 can control the print engine unit 140 to print the image the orientation of which has been adjusted through the above-described series of operations, and may store the image the orientation of which has been adjusted in the storage unit 120 or may transmit the image the orientation of which has been adjusted to a terminal device (not illustrated) through the interface 130.

Accordingly, the image forming apparatus 100 can detect whether the image has normal or inverted orientation or whether the image is in the horizontal mode or the vertical mode, and can adjust the orientation of the image automatically according to the detected orientation.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A method of detecting orientation of an image, the method comprising:
    selecting text blocks;
    testing whether the number of text blocks N is less than a pre-set threshold T;
    if the number of text blocks N is less than the pre-set threshold T, not detecting the orientation of the document;
    if the number of text blocks N is greater than the pre-set threshold T, filling non-text areas with white color;
    transforming the image into a binary image;
    calculating asymmetry parameters of text (asym0, asym90);
    calculating a horizontal coefficient (ah) and a vertical coefficient (av);
    testing whether the parameter (asym0) is greater than zero and whether the horizontal coefficient (ah) is greater than the vertical coefficient (av);
    if a result of testing whether the parameter (asym0) is greater than zero and the horizontal coefficient (ah) is greater than the vertical coefficient (av) is positive, determining that the image has correct orientation;
    if a result of testing whether the parameter (asym0) is greater than zero and the horizontal coefficient (ah) is greater than the vertical coefficient (av) is negative, testing whether the parameter (asym0) is less than zero and whether the horizontal coefficient (ah) is greater than the vertical coefficient (av);
    if a result of testing whether the parameter (asym0) is less than zero and the horizontal coefficient (ah) is greater than the vertical coefficient (av) is positive, turning the image by 180 degrees;
    if a result of testing whether the parameter (asym0) is less than zero and the horizontal coefficient (ah) is greater than the vertical coefficient (av) is negative, testing whether the parameter (asym90) is greater than zero and the horizontal coefficient (ah) is less than the vertical coefficient (av);
    if a result of testing whether the parameter (asym90) is greater than zero and the horizontal coefficient (ah) is less than the vertical coefficient (av) is positive, turning the image by 90 degrees; and
    if a result of testing whether the parameter (asym90) is greater than zero and the horizontal coefficient (ah) is less than the vertical coefficient (av) is negative, turning the image by 270 degrees.

2. The method of claim 1, wherein the method of detecting the orientation is performed prior to generating a copy for the image.

3. An image forming method of an image forming apparatus, the image forming method comprising:
    receiving an image;
    detecting a text area of the image;
    transforming the detected text area into a binary image and calculating an asymmetry parameter of the binary image based on a number of lines projecting perpendicularly from at least one line of text within the detected text area; and
    detecting orientation of the image based on the calculated asymmetry parameter.

4. The image forming method of claim 3, further comprising:
    if the detected orientation of the image differs from a default direction, adjusting the orientation of the image.

5. The image forming method of claim 4, further comprising printing the image the orientation of which is adjusted.

6. The image forming method of claim 4, further comprising storing the image the orientation of which is adjusted.

7. The image forming method of claim 3, wherein the receiving the image comprises scanning an image through a scanning unit of the image forming apparatus.

8. The image forming method of claim 3, wherein the calculating the asymmetry parameter comprises calculating an asymmetry coefficient, a horizontal coefficient, and a vertical coefficient of the text.

9. The image forming method of claim 3, wherein the detecting the orientation comprises detecting whether the image is in a horizontal mode (portrait) or a vertical mode (landscape) and whether the image is oriented up or down in each mode.

10. The image forming method of claim 3, wherein the each of the lines projecting perpendicularly from the at least one line of text within the detected text area project in one of a first direction and a second direction parallel to the first direction.

11. The image forming method of claim 10, wherein the at least one line of text is positioned correctly when the at least one line of text is horizontal within the binary image, the lines projecting in the first direction project upward with respect to the at least one line of text, and the number of lines projecting in the first direction exceeds the number of lines projecting in the second direction.

12. An image forming apparatus comprising:
a text detection unit to detect a text area of an input image;
a coefficient calculation unit to transform the detected text area into a binary image and to calculate an asymmetry parameter of the binary image based on a number of lines projecting perpendicularly from at least one line of text within the detected text area; and
an orientation detection unit to detect an orientation of the image based on the calculated asymmetry parameter.

13. The image forming apparatus of claim 12, further comprising an orientation adjustment unit to adjust the orientation of the input image if the detected orientation of the image differs from a default direction.

14. The image forming apparatus of claim 13, further comprising a print engine unit to print the image the orientation of which is adjusted.

15. The image forming apparatus of claim 13, further comprising a storage unit to store the image the orientation of which is adjusted.

16. The image forming apparatus of claim 12, further comprising a scanning unit to scan an image,
wherein the text detection unit receives the image scanned by the scanning unit.

17. The image forming apparatus of claim 12, wherein the coefficient calculation unit calculates an asymmetry coefficient, a horizontal coefficient and a vertical coefficient of the text.

18. The image forming apparatus of claim 12, wherein the orientation detection unit detects whether the image is in a horizontal mode (portrait) or a vertical mode (landscape) and whether the image is oriented up or down in each mode.

* * * * *